(12) United States Patent
Spetalnick

(10) Patent No.: US 9,122,318 B2
(45) Date of Patent: Sep. 1, 2015

(54) METHODS OF AND SYSTEMS FOR REDUCING KEYBOARD DATA ENTRY ERRORS

(76) Inventor: Jeffrey R. Spetalnick, New York, NY (US)

( * ) Notice: Subject to any disclaimer, the term of this patent is extended or adjusted under 35 U.S.C. 154(b) by 630 days.

(21) Appl. No.: 13/232,237

(22) Filed: Sep. 14, 2011

(65) Prior Publication Data

US 2012/0062465 A1 Mar. 15, 2012

Related U.S. Application Data

(60) Provisional application No. 61/382,967, filed on Sep. 15, 2010, provisional application No. 61/407,670, filed on Oct. 28, 2010.

(51) Int. Cl.
| | |
|---|---|
| *G06F 3/02* | (2006.01) |
| *G06F 3/023* | (2006.01) |
| *G06F 3/0481* | (2013.01) |
| *G06F 3/0488* | (2013.01) |
| *G06F 3/0489* | (2013.01) |
| *G06F 17/27* | (2006.01) |

(52) U.S. Cl.
CPC ............ *G06F 3/0236* (2013.01); *G06F 3/0238* (2013.01); *G06F 3/04815* (2013.01); *G06F 3/04886* (2013.01); *G06F 3/04895* (2013.01); *G06F 17/276* (2013.01); *G06F 2203/04806* (2013.01)

(58) Field of Classification Search
None
See application file for complete search history.

(56) References Cited

U.S. PATENT DOCUMENTS

| | | | |
|---|---|---|---|
| 5,128,672 A | 7/1992 | Kaehler | |
| 5,774,109 A | 6/1998 | Winsky et al. | |
| 5,778,404 A | 7/1998 | Capps et al. | |
| 6,803,905 B1 * | 10/2004 | Capps et al. | ................. 345/173 |
| 2003/0144830 A1 | 7/2003 | Williams | |

(Continued)

FOREIGN PATENT DOCUMENTS

| FI | EP0676781 A1 * 10/1995 |
|---|---|
| KR | 1020100024292 A * 3/2010 |

(Continued)

OTHER PUBLICATIONS

International Search Report and Written Opinion for PCT/US2011/051524; issued Apr. 24, 2012.

(Continued)

*Primary Examiner* — Grant Sitta
*Assistant Examiner* — Kirk Hermann
(74) *Attorney, Agent, or Firm* — Cowan, Liebowitz & Latman, P.C.; Mark Montague; Serge Krimnus

(57) ABSTRACT

Method of and system for reducing data entry errors that ascertains a subset of keys that can be selected by a user based upon the respective likelihood that each key follows a previously selected key within a predetermined language, corpus, or subset thereof, and controls the display of the keys within an input device so that the keys within the ascertained subset are displayed in a visually distinguishable manner from the keys that not within the ascertained subset. In a touch screen device, the keys that are displayed are part of the soft keys displayed on the screen. In a system that includes an actual physical keyboard, the appearance of select keys of the keyboard can be modified in various manners, including the use of an LCD display or other controllable lighting mechanism disposed within the keyboard. Multiple additional techniques for reducing data entry also are disclosed.

36 Claims, 18 Drawing Sheets

(56) References Cited

U.S. PATENT DOCUMENTS

| | | |
|---|---|---|
| 2004/0070567 A1 | 4/2004 | Longe et al. |
| 2004/0168131 A1 | 8/2004 | Blumberg |
| 2004/0174400 A1 | 9/2004 | Herigstad et al. |
| 2004/0183833 A1 | 9/2004 | Chua |
| 2004/0205534 A1* | 10/2004 | Koelle ............ 715/507 |
| 2005/0210402 A1 | 9/2005 | Gunn et al. |
| 2006/0097991 A1 | 5/2006 | Hotelling et al. |
| 2006/0119582 A1 | 6/2006 | Ng et al. |
| 2006/0190256 A1 | 8/2006 | Stephanick et al. |
| 2006/0265648 A1 | 11/2006 | Rainisto et al. |
| 2007/0233463 A1 | 10/2007 | Sparre |
| 2007/0298818 A1 | 12/2007 | Krutik |
| 2008/0122796 A1* | 5/2008 | Jobs et al. ............ 345/173 |
| 2008/0167858 A1 | 7/2008 | Christie et al. |
| 2008/0218950 A1 | 9/2008 | Morrison |
| 2009/0077464 A1 | 3/2009 | Goldsmith et al. |
| 2009/0079702 A1* | 3/2009 | Colley ............ 345/173 |
| 2009/0195506 A1 | 8/2009 | Geidl et al. |
| 2009/0237359 A1* | 9/2009 | Kim et al. ............ 345/168 |
| 2009/0251422 A1* | 10/2009 | Wu et al. ............ 345/173 |
| 2010/0073329 A1* | 3/2010 | Raman et al. ............ 345/177 |
| 2010/0131900 A1 | 5/2010 | Spetalnick |
| 2010/0277424 A1* | 11/2010 | Chang et al. ............ 345/173 |
| 2011/0007004 A1 | 1/2011 | Huang et al. |
| 2011/0018812 A1* | 1/2011 | Baird ............ 345/173 |
| 2011/0084922 A1* | 4/2011 | Rider et al. ............ 345/173 |
| 2011/0314405 A1* | 12/2011 | Turner et al. ............ 715/773 |

FOREIGN PATENT DOCUMENTS

| | | |
|---|---|---|
| KR | 1020100024292 A1 | 3/2010 |
| WO | 2010099835 A1 | 9/2010 |

* cited by examiner

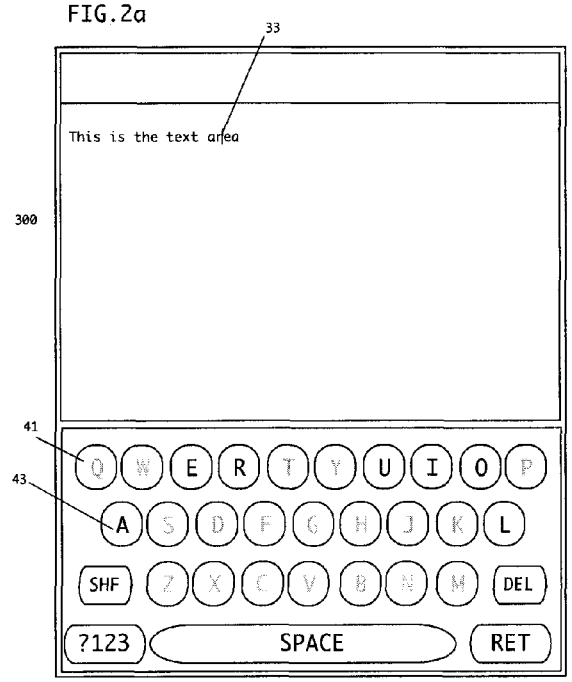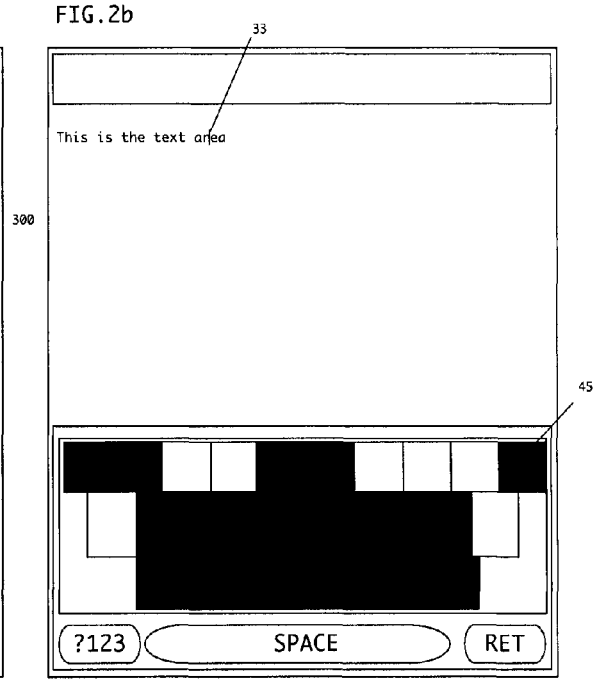

FIG.3a
FIG.3b
FIG.3c
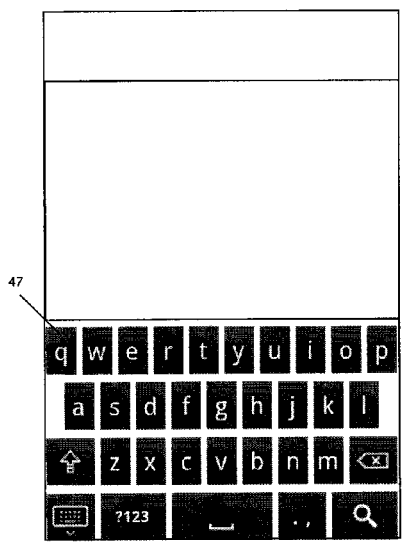
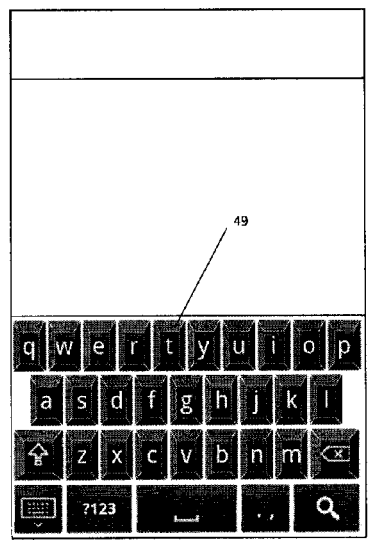
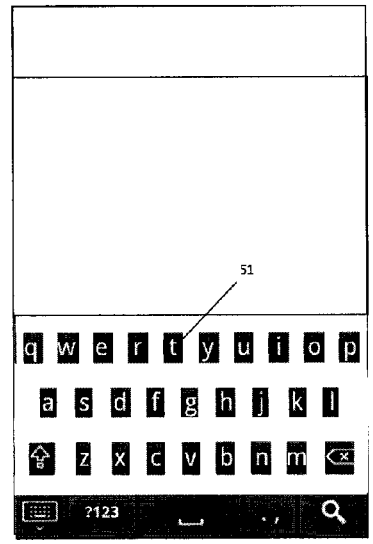
FIG.3d
FIG.3e
FIG.3f
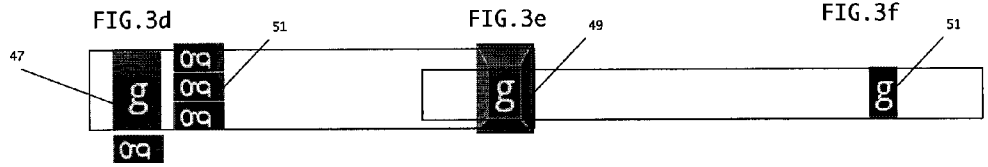

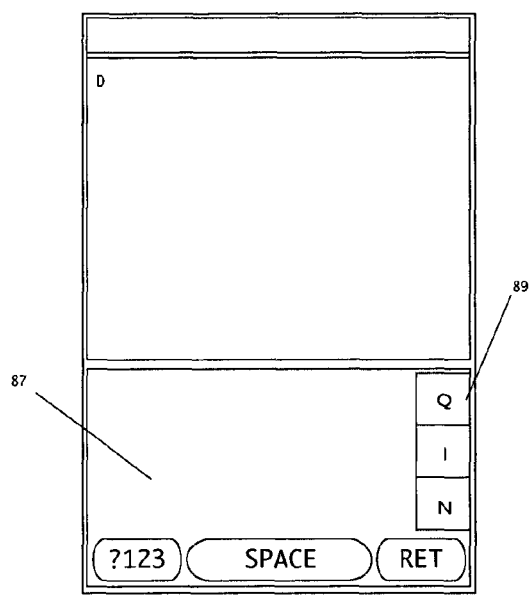

FIG.11a
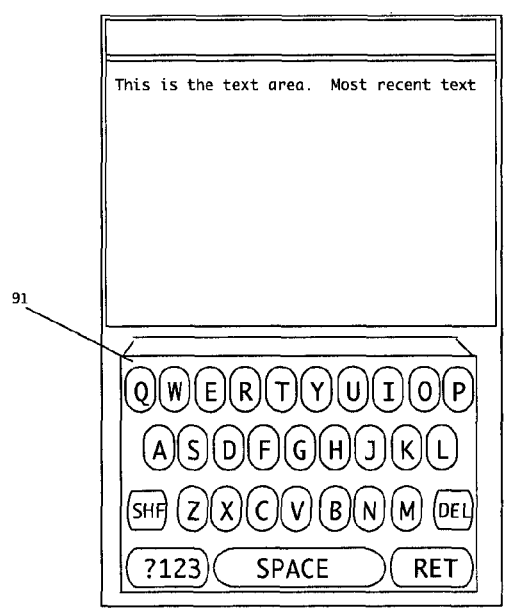
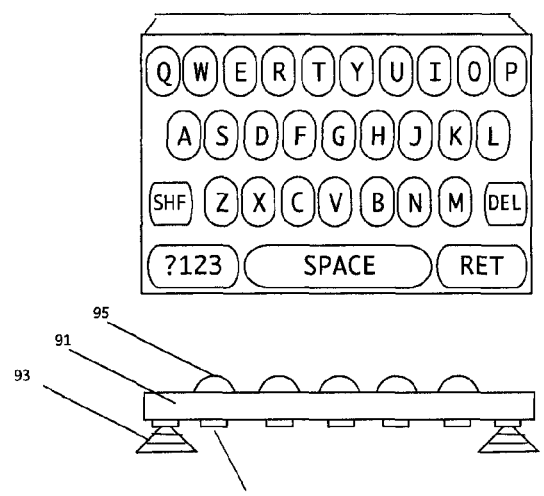
FIG.11b
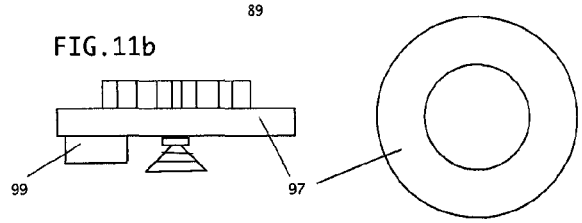

121

123

METHODS OF AND SYSTEMS FOR REDUCING KEYBOARD DATA ENTRY ERRORS

REFERENCE TO RELATED APPLICATIONS

This application claims priority to U.S. Provisional Patent Application No. 61/382,967, filed Sep. 15, 2010, and to U.S. Provisional Patent Application No. 61/407,670, filed Oct. 28, 2010, the disclosures of which are incorporated herein by reference.

FIELD OF THE INVENTION

The present invention relates to methods of and systems for reducing keyboard data entry errors and specifically relates to methods of and systems for using frequency-weighted algorithms to dynamically configure the appearance of soft buttons and menus on a touch screen of a device or physical keys on a device with actual keys. More specifically, the present invention entails establishing the appearances of keys, soft keys, buttons and menus to provide ease of input by a user that results in finding the desired key or menu item more quickly and with fewer errors. The present invention also entails providing further error reduction by creating a focus region for the user that is smaller than the actual key or menu item that enhances the ability to reduce errors. Other manners of additional error reduction and enhanced keyboard features also are disclosed.

SUMMARY AND OBJECTS OF THE INVENTION

The present invention can be employed on a device that includes a touch screen interface as well as on devices with physical keys. Within a touch screen device, the present invention entails a touch screen interface providing soft buttons whose functionality are dependent on and dynamically change as keys are entered. For a device without a touch screen, the algorithm can dynamically change the appearance of the physical keys using various mechanisms such as light or color.

The detection of the key press provides for transitioning the virtual keys of a device's display between one set of keyboard views and another or determining which physical keys are highlighted. The keyboard image displayed after a virtual key is pressed or the highlighting of a physical keyboard is reconfigured so as to minimize the keys that need to be reviewed by the user when looking for the user's next key to press.

In the prior art, when entering keys, a user will have the tendency to repeatedly scan the keyboard to press the next key that corresponds to the letter the user is searching for. The user is faced with the problem of often having to review letter choices that are extremely unlikely to occur in the language such as the letter pair FZ.

It is a primary objective of the present invention to solve the above-mentioned problem by dynamically changing the appearance of the soft buttons displayed on a touch screen device or highlighting particular physical keys to reflect the statistical likelihood of the next key being the one that the user might want to select or using another technique herein described that reduces errors and provides other advantages not currently available.

To accomplish this and other objectives, according to the present invention, a touch screen interface and a means for detecting a key press, which are present in all input type devices, are used to dynamically change the appearance of soft keys. The soft keys' appearance may be changed in various ways such as changing the brightness or color or using a different font or highlighting or dimming a particular letter key. It can be accomplished by relating the statistical probability to any number of groupings, but the preferred embodiment uses just two.

It is an additional objective and feature of the invention to allow the keyboard to work better with a predictive text system to further reduce keystrokes and allow for faster input with fewer errors. The improved input system that uses reduced keystrokes along with predictive text systems can be used on various devices including but not limited to touch screen computers, mobile devices, remote controls, POS systems, electronic book readers, and car consoles.

To accomplish this objective on a device with physical keys, various techniques can be used to highlight the most likely keys. In one version of the present invention, physical keys are lit from behind using an LCD screen that change based upon the letter frequency blocking light from reaching those keys with a low probability of being the user's choice.

It is another feature to further reduce errors by creating a key that has a smaller focus area for the user to strike the key or button. In one embodiment of the present invention, the user is shown a three dimensional representation of a key or user interface button. While the displayed key has the same size as the two dimensional representation, the top surface of the 3-dimensional representation is over 50% smaller than the area that is mapped to the key, providing a smaller target for the user to aim for. As it has been shown that the distribution of a user's taps is related to the target size, by reducing the target size but keeping the true size constant, error rates can be reduced. This error reducing system can be expanded to any type of data input item on a virtual screen that requires selection by the user.

It is a further feature to reduce errors by allowing a secondary sensor to detect the proximity of the user's finger to the keyboard and magnify the area of the screen that appears under the finger or highlight the key or button that will be selected so that the buttons or icons to be selected are larger than their original size making it easier to select. This could be accomplished by transmitting infrared light that can be reflected back by the user's finger and received by sensors in the screen.

It is an additional feature to make it easier for users who are not familiar with the layout of the QWERTY keyboard to have an alphabetical keyboard that uses larger buttons to avoid errors. One method provides users with the most common letters in an individual key and combines less frequent letters. Another method allows the user to use a more familiar layout similar to a standard 12-key phone, but also allow the user to slide across the key to more quickly make a selection.

It is an additional feature to allow an editable word bar to appear near the keyboard that repeats the words that are entered so that the text appears closer to the keyboard and acts as a proxy for words that are farther away.

It is an additional feature to further reduce keystrokes and errors by customizing the experience of the word choices based upon the location of the cursor.

It is an additional feature to further reduce keystrokes and errors by giving the user a zoomed in view of the key that will be entered based upon the user's finger position, but allow the user to adjust their finger to the surrounding letters before lifting up their finger to make any corrections before the error occurs.

It is an additional feature to provide the user with a gesture based input to use with a predictive text system that minimizes movement.

It is an additional feature to provide the user with a physical keyboard attachment that can be added to a virtual keyboard using suction cups, removable adhesive, or other means and have a rubber material that has capacitive material included so that the user's key press is recorded by the touch-screen device.

It is an additional feature to allow the keyboard to be positioned anywhere on a tablet with the ability for the user to change between various keyboard types, including a full sized keyboard or hiding the keyboard by selecting an alternate keyboard button. An additional button can be added that can zoom in on words or allow the keyboard to lock or be repositioned anywhere on the screen.

It is an additional feature to allow the user to access menus from the bottom of the screen and have a menu that can slide to the next menu so that more choices can be shown to the user despite often having limited space.

It is an additional feature to allow the keyboard to expand the predictive text system to reduce keystrokes using a remote control as an input means and allowing the user to choose from 9 choices using a numeric keypad on the remote control and choose different groups of items using other keys on the remote such as arrow keys.

It is an additional feature to allow the keyboard to work better with a tablet computer by creating the word keys in the center of the keyboard with a split key interface and providing a means of selecting them, or providing the user with a circular keypad that could be enhanced by a switch that is easy to reach by the users other hand that could spin the circular keyboard around allowing the size of the keys to be larger.

It is an additional feature to allow users to make a key selection by using a reduced set of buttons, in this case five which can use a tree-based system for making user selections by selecting a range of choices and narrowing the selection after making the first selection.

It is an additional feature to allow users to set up buttons to make their choices faster and avoid errors by creating a user setting system that lets the user decide what the appropriate time is for holding a button down to get multiple results on a short or long key press.

It is an additional feature to allow users to have a long key press and short key press enter data in differing ways. Integrated with a predictive text system, a key can provide the user with word choices to select. Pressing the word choice for a short key press can insert the text along with a space. Pressing the word choice for a long key press can insert the word without a space and cause the system to use the inserted word to look up other words that start with similar characters to more easily bring up the word the user wants.

It is an additional feature to allow the above mentioned feature allow words that are selected with a long press to display other forms of the word such as different cases, or the word with an apostrophe added or other features that can enhance the word that is selected. When the user selects a word that is very frequent such as "like" and holds it for a long press, the user can be shown additional choices such as "likely" without having to type additional keys. In the event that a more frequent word is longer than the word the user wants, the user can select the longer word such as "events" and the long press can enter the word and using the backspace key can be shown additional choices based upon the word the user wanted.

It is an additional feature to allow the long press short press feature to allow predictive searching in search engines to gain added functionality. Currently, when the user is shown a predictive choice, the text is automatically searched. With a long press on the predictive choice, that word or phrase can be entered along with a space, but give the user the opportunity to add additional information to their search query. The user can be shown additional choices that incorporate the users first choices, allowing more complex and more accurate searches for the user. An additional menu can also be shown giving additional options to the user to further improve the results.

It is an additional feature to allow users to more easily and accurately enter symbols, numbers and phrases on any device with a keyboard using only the letter keys in the alphabet of the language. Since every word is made up of letters, and every symbol and digit has a name, this process can allow for typing anything using only the letter keys. Since very few words start with double letters, "Aardvark" is an example, by requiring the user to double tap the first letter of the item that they would like to enter, symbols and digits can be easily differentiated from words the user might want to enter.

In accordance with a particular embodiment of the present invention, a system is provided for reducing data entry errors that comprises: an input component controllable to display a plurality of keys selectable by a user in accordance with a controllable viewing mode, the input component receiving input by the user; a display component controllable to display one or more key images; a processor operatively coupled to the input component and the display component, and programmed to: control the display component to display a key image or images corresponding to key selection input by the user on the input component; ascertain a subset of the keys selectable by the user based upon respective likelihoods that each of the keys follows a previously selected key or keys within a predetermined language or subset thereof; define the controllable viewing mode so that the input component displays each of the keys within the ascertained subset of keys in a manner visually distinguishable by the user from each of the keys not within the ascertained subset of keys; and control the input component to display the plurality of keys selectable by the user in accordance with the controllable viewing mode as defined by the processor.

In accordance with a further embodiment of the present invention, a method of reducing data entry errors in a system having an input component, a display component and a processor operatively coupled to the input and display components is provided, the method comprising: displaying, by the input component, a plurality of keys selectable by a user in accordance with a controllable viewing mode, receiving, by the input component, input by the user; displaying, by the display component, one or more key images based on the input by the user; ascertain, by the processor, a subset of the keys selectable by the user based upon respective likelihoods that each of the keys follows a previously selected key or keys within a predetermined language or subset thereof; defining the controllable viewing mode so that the input component displays each of the keys within the ascertained subset of keys in a manner visually distinguishable by the user from each of the keys not within the ascertained subset of keys.

For each of these embodiments, the present invention entails further aspects and features thereof, the summary of which are set forth below.

As an aspect of the invention, a location on the input component of each of the keys selectable by the user as displayed by the input component is the same regardless of the controllable viewing mode as defined by the processor.

As a feature of this aspect, the input component displays the plurality of keys in accordance with a QWERTY format.

As a further aspect of the invention, the input component and the display component collectively are a touch sensitive display, As a feature of this aspect, the input component displays a plurality of display elements and displays the plurality of keys selectable by the user within the display elements in accordance with the controllable view mode.

As another aspect of the invention, the input component includes a physical keyboard having a plurality of physical key switches, the input component further including a display device projecting images of the keys on an underside of each of the physical key switches in accordance with the controllable viewing mode as defined by the processor.

As an additional aspect of the invention, the input component includes a physical keyboard having a plurality of physical key switches, each of the keys selectable by the user presented on a respective one of the physical key switches, the input component further including a lighting device operative to project light on an underside of each of the physical key switches in accordance with the controllable viewing mode as defined by the processor.

As yet a further aspect of the invention, the input component displays the keys in a circular format.

As yet another aspect of the invention, the keys selectable by the user are letters in the predetermined language.

As yet an additional aspect of the invention, the processor is programmed to establish a target area on the input component of each of the keys to be substantially smaller than a displayed size of the respective key as displayed by the input component, the processor recognizing a key selection input by the user by contact within the respective target area of the key on the input component.

As a feature of this aspect, the input component displays each of the keys selectable by the user in a manner to have a three-dimensional format in which each key is displayed to have a respective top surface and respective side surfaces, and the target area of each of the keys corresponds to the respective top surface of the key displayed by the input component.

As a further aspect of the invention, the processor defines the controllable viewing mode so that the input component is controlled to display each of the keys within the ascertained subset of keys in a three-dimensional format that includes a top surface and side surfaces, and to display each of the keys not within the ascertained subset of keys in a three-dimensional format that includes a bottom surface and side surfaces.

As yet another aspect of the invention, a proximity sensor recognizes a presence of a finger adjacent the input component, and the processor is programmed to control the input component to display each of the displayed keys that are proximal to the finger in a magnified format.

As yet a further aspect of the invention, the processor controls the display component to display, at a location immediately adjacent to a location of the input component, a duplicate copy of recently selected keys so that the user is able to view and verify the keys being selected without viewing a portion of the display component not adjacent to the input component.

In accordance with yet another embodiment of the present invention, a predictive text entry system is provided that comprises an input component controllable to display a set of letters selectable by a user and to display a set of word selections selectable by the user, the input component receiving input by the user; a display component controllable to display one or more letter images or words; a processor operatively coupled to the input component and the display component, and programmed to: control the display component to display a letter or word corresponding to an input by the user on the input component; determine a corpus based on a location of a cursor displayed on the display component; ascertain a set of choices within the determined corpus that are statistically the most likely choices based on a previous input of a letter by the user; control the input component to display the choices within the ascertained set of choices as the set of word selections selectable by the user.

In accordance with yet a further embodiment of the present invention, a method of predicting text entry in a system having an input component, a display component and a processor operatively coupled to the input and display components is provided, the method comprising: displaying, by the input component, a set of letters selectable by a user; displaying, by the input component, a set of word selections selectable by the user; receiving, by the input component, input by the user; displaying, by the display component, one or more letter images or words based on the input by the user; determining, by the processor, a corpus based on a location of a cursor displayed on the display component; ascertaining, by the processor, a set of choices within the determined corpus that are statistically the most likely choices based on a previous input of a letter by the user; controlling the input component to display the choices within the ascertained set of choices as the set of word selections selectable by the user.

For both the above summarized predictive text entry method and system embodiments, an aspect thereof is that the display component displays one or more corpuses, and the processor determines the corpus in which to ascertain a set of choices based upon the displayed corpus that is adjacent to the cursor displayed on the display.

Additional embodiments or aspects of the present invention are further set forth below.

A text entry system/process that uses a set of novel multi-touch gestures to represent letters, numbers and/or symbols.

A text entry system/process that uses an external keyboard that can be attached directly to a touch-screen and that can convert a touch-screen data entry system into a physical keyboard based entry system by various means such as a rubber keyboard that adheres temporarily using suction cups with a quantity of capacitive material necessary to be detected by the touch sensitive surface.

A text entry system/process that uses a virtual keyboard that can be repositioned anywhere on a tablet device so that the keyboard can be used in a wide range of applications where a keyboard with a fixed location could interfere with different screen layouts.

A menu system/process on a tablet or handset with a touch screen that provides access to menus on the bottom of the screen that can slide to allow the user to be shown more choices than would fit on a fixed size menu.

A predictive text system/process that uses a remote control handset to select from groupings of nine letters, or words by using the frequency weighted likelihood of the letter or word to determine what the user is displayed and using arrow keys to change the nine letters or words displayed so that all choices can be made available.

A virtual keyboard that can be used on larger touch-screen devices such as tablets where the keyboard is split to allow easier access to the letters when the user is holding the device or creating a circular keyboard that allows easier access by the hands holding the device to select a key.

A predictive text system/process that uses a tree-like structure that dynamically changes after a keypress to allow a small subset of initial choices to expand with each selection and provide for all possibilities with enough branching steps.

Various other objects, advantages and features of the present invention will become readily apparent to those of ordinary skill in the art from the following detailed description of the invention.

BRIEF DESCRIPTION OF THE DRAWINGS

The following detailed description, given by way of example and not intended to limit the present invention solely thereto, will best be appreciated in conjunction with the accompanying drawings in which:

FIG. 2a schematically illustrates a portable hand held device with physical keys displaying content and soft buttons after a key is selected.

FIG. 2b schematically illustrates a LCD screen inside of a portable hand held device with physical keys between the light system and the keys that direct light to the keys that are to be highlighted.

FIGS. 3a to 3f schematically illustrate a portable hand held device with the additional improvement to further reduce errors by creating a smaller key target area for the user to select and shows the difference between the key size and the target area.

FIGS. 10a and 10b schematically illustrate a multi-touch gesture based input system that can be used instead of a keyboard to access a predictive text system. It also allows the user to correct a key that was entered by allowing the user to select from the most likely alternatives.

FIG. 11a schematically illustrates a physical keyboard that can be attached to a virtual keyboard to improve typing along with additional physical devices that can be attached that use capacitive materials to interact with a touch screen device.

FIGS. 11a and 11b schematically illustrate a portable hand held device with the additional improvement of a predictive keyboard with a long press or short press that can be used to select an secondary function from a key such as entering the number 2 on a key that would otherwise have displayed a DEF.

DETAILED DESCRIPTION OF THE INVENTION

The present invention relates to a method of and system for dynamically configuring the visibility of soft buttons on the touch screen of a device or actual physical keys on a keyboard based on the prior keys that are selected and the statistical frequency of a letter's usage in the language or a specialized subset of the language such as words used in a region or industry. Statistical frequency of a letter's usage in language is discussed in detail in U.S. Patent Publication No. 2010/0131900, published on May 27, 2010, and filed by the applicant hereof. U.S. Patent Publication No. 2010/0131900 is incorporated herein by reference.

Figure 1A:
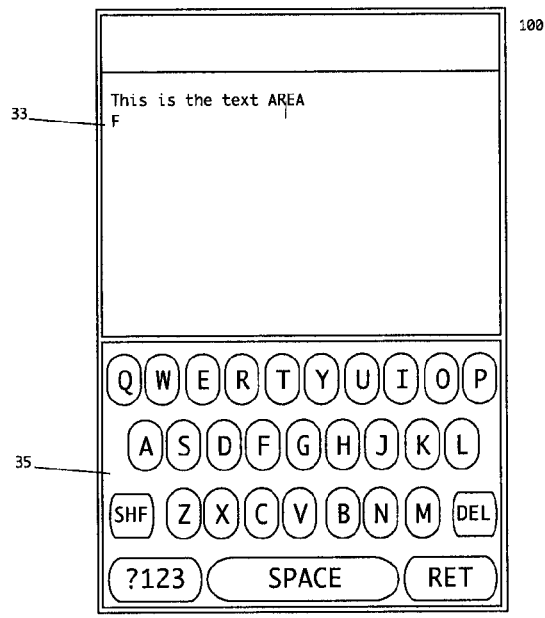
FIG. 1a schematically illustrates a portable hand held device displaying content and soft buttons.

FIG. 1a of the accompanying drawings schematically illustrates a portable hand held device displaying content and soft buttons. The hand held device includes any known hand held device having a touch screen interface or a physical key that has the ability to use a means of providing additional information to the user such as a screen or backlighting. It can also apply to a remote control unit or a device with fewer buttons than letters in the alphabet.

As shown, a hand held device 100 includes a viewing area 33 (also called "display component") and soft buttons 35 (also called "input component") positioned below the viewing area 35. For example, if the displayed content is text, then the soft buttons 35 might include text entry buttons and keys to provide additional editing features. Hand held device 100 further includes other components including a processor (e.g., CPU 32 shown in FIG. 3 of U.S. Patent Publication No. 2010/0131900, incorporated herein by reference) that is suitably programmed to carry out the processes described herein along with associated circuitry sufficient to enable the processor to properly control any viewing area or display of the systems of the present invention. Since the particular hardware structure and design of hand held and other types of devices mentioned herein are well known in the art, further discussion thereof is omitted except where necessary for an understanding of the present invention. Moreover, since the teachings of particular steps and processes that are carried out in the various embodiments and variations thereof as described herein are sufficient to enable those of ordinary skill in the art to suitably program a processor and other devices that may be employed within the present invention, exemplary code or software is not provided except where particularly necessary for an understanding of the present invention.

Figure 1B:
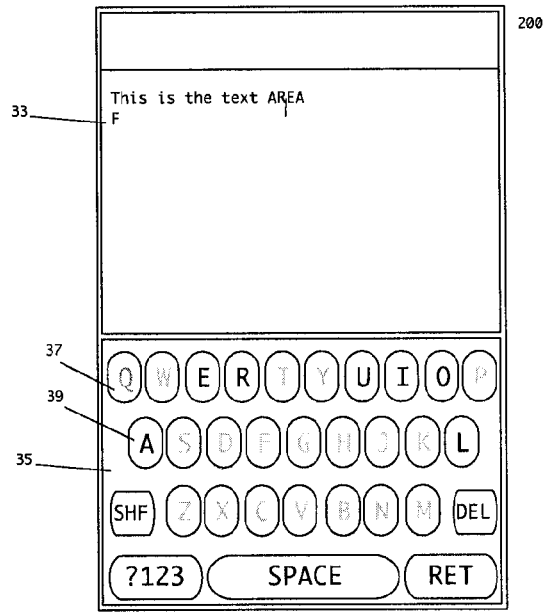
FIG. 1b schematically illustrates the soft keys showing the most likely next key after the user has typed a letter, in this example the letter "F".

In FIG. 1b, hand held device 100 is shown having transitioned to a statistically defined keyboard after a keystroke has been made (identified as device 200 in FIG. 1b). The transition to the next key viewing mode is initiated by a detected keystroke of the hand held device from the original keyboard display 100 to a statistically weighted viewing mode. The detected key press is looked up against a table that determines the keys that are most likely to follow those that have already been selected. As shown, the hand held device 200 has detected the letter "F" from the original keyboard 100 and has changed to a statistically reduced view 200. As discussed above, the soft keys 35 are differentiated based upon their frequency weighted probabilities in a given language or corpus or subset thereof. In the statistically weighted viewing mode, the most likely keys that might be selected 35 are shown at the bottom of the hand held device 200 and the soft buttons that are most likely 39 are displayed in a way that differentiates them from those that are less likely 37. That is, the keys that are likely to be selected represent a subset of all of the keys and are ascertained based on a likelihood that each of such keys follows a previously selected key or keys within a particular language, corpus, or subset thereof. Then, the "viewing mode" of the soft buttons 35 is defined in accordance with the ascertained subset of keys so that the soft buttons are presented in a manner in which the keys within the ascertained subset are visually distinguishable from the keys that are not within the subset. In FIG. 1b, the keys within the ascertained subset (i.e., those most likely to be selected by the user after the prior selection of the "F" key) include the vowels A, E, I, O and U, and the consonants L and R, and those keys are displayed in a more visible manner to the user. In the illustrative figure, the other keys are shown faded thus assisting the user in quickly finding a key that is statistically likely to be selected after the "F" key has been selected. Other manners to differentiate the keys may be employed, including using different colors, different levels of brightness, different types of fonts, different font sizes (e.g., the keys within the subset are displayed larger than the other keys), and other visual representations.

FIGS. 2a and 2b schematically illustrate a hand held device 300 with a physical keyboard (input component) that has also transitioned to a statistically defined keyboard after a keystroke has been made. To highlight the statistically most likely keys on a physical device (e.g., the physical keyboard having physical key switches), an LCD screen 45 is enclosed within the device in a way that blocks light transmission from reaching keys that are statistically less likely to be chosen. In one version, the physical keyboard includes an LCD screen disposed underneath the physical key switches and a board, such as circuit board, disposed between the LCD screen and the key switches contains holes that are located in the center of each key to allow light to pass through from the LCD screen, wherein the LCD is controlled to provide light to those keys within the ascertained subset to light up the corresponding key switches, with the other key switches remaining in a darkened state or a low-lighting state. Rather than an LCD screen, other manners of providing light may be employed including the use of fiber-optics. Controllable devices that project images on the underside of the key switches may also be employed. Other manners of implementation may be possible.

FIGS. 3a to 3c schematically illustrate a portable hand held device with the additional improvement to further reduce errors by creating a smaller key target area for the user to select and shows the difference between the key size and the target area. In FIG. 3a, a standard virtual keyboard is shown with the original key 47. Because the edges of the keys are close to each other, a user trying to select a key can often select another key in error. FIG. 3b shows the improved keyboard that has larger keys 49 that are shaped to provide the illusion of being a physical key. That is, the keys are portrayed to have a three-dimensional appearance. While the keys in FIG. 3b appear to be larger, the real size of the target that the user is focused on is actually much smaller as shown as 51 in FIG. 3c. FIGS. 3d to 3f show the comparison between the original key's target area and the new target area. As the height of key 51 is the same as the width of key 47, it can be easily seen that the new target area is over 60% smaller than before while giving the user the illusion that the key is actually bigger. As errors have been shown to be statistically dispersed around a target area, having a smaller target area within a larger key has the ability to significantly reduce typographical errors.

Figure 4:
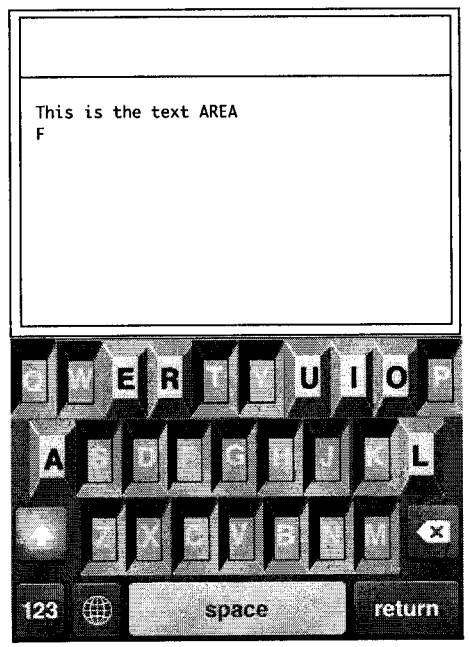
FIG. 4 schematically illustrates a portable hand held device with the additional improvement to further reduce errors by creating a smaller key target area along with the method of identifying the statistically most likely keys.

FIG. 4 schematically illustrates an example of the combined usage of both the statistical weighting to determine the next key along with the reduced target area. For example, the most likely keys to be selected (e.g., keys A, E, I, L, O, R, U) are shown in a manner that visually appear to be coming out of the keyboard wherein the user would be contacting what appears to be each of the key's top surface, and the other keys are shown in a manner that visually appear to be going into the keyboard (wherein contact would be made on what appears to be each key's bottom surface). As a variation, the size of the target of each key likely to be selected can be made larger than the target of each key not likely to be selected. As a further variation, the three-dimensional representation of the two sets of keys can visually be different, such as providing a smaller three-dimensional representation of keys not likely to be selected.

Figure 5A:
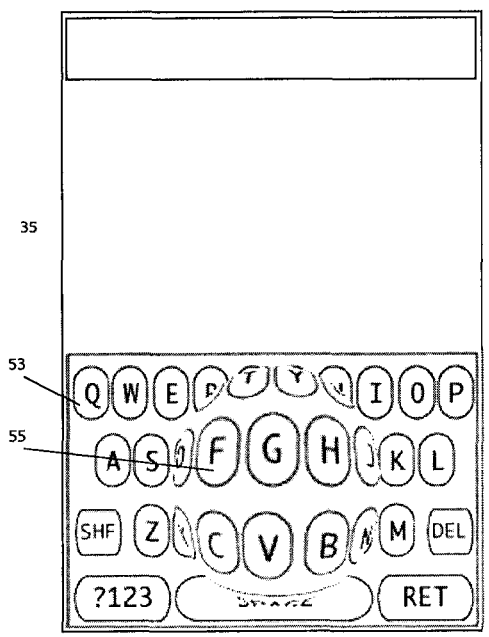
FIGS. 5a and 5b schematically illustrate a display that can sense the user's finger as it gets close to (but not touch) the display and have the screen magnify to make it easier to select a button or icon.
Figure 5B:
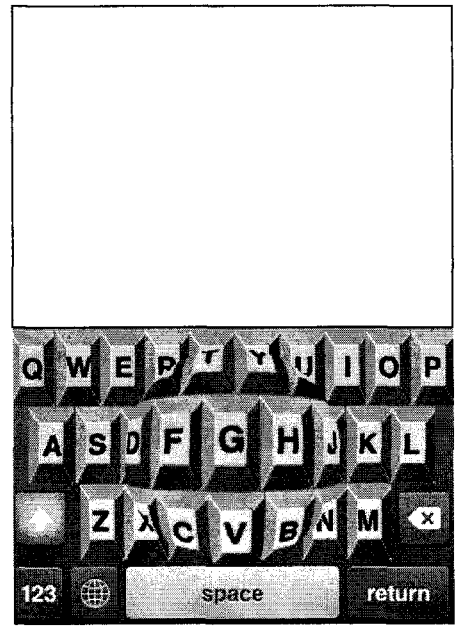

FIGS. 5a and 5b schematically illustrate another improvement that further enhances the ability of a user to correctly select a key by magnifying the keys as the user's finger gets close to the screen by way of an additional proximity sensor. As shown, the keys that are proximal to a sensed finger are displayed in a magnified format. In one version, infrared light is transmitted by the device, reflected back by the user's finger and sensed by suitable sensors disposed in or beneath the screen.

Figure 6A:
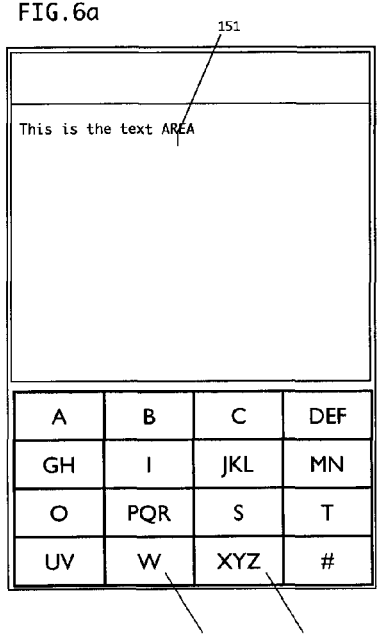
FIGS. 6a to 6c schematically illustrate the use of an alphabetical keyboard that is based upon the letter frequencies as well as means of improving the organization of symbols and emoticons as well as an improved way of selecting an individual key by sliding.
Figure 6B:
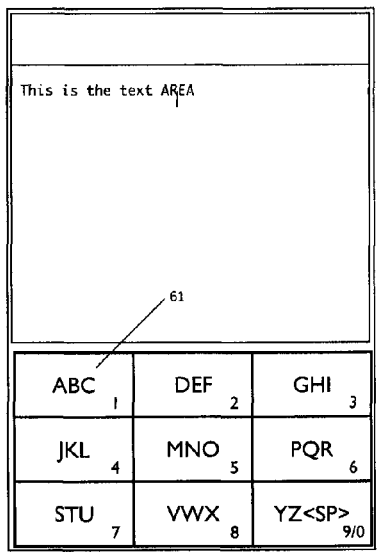
Figure 6C:
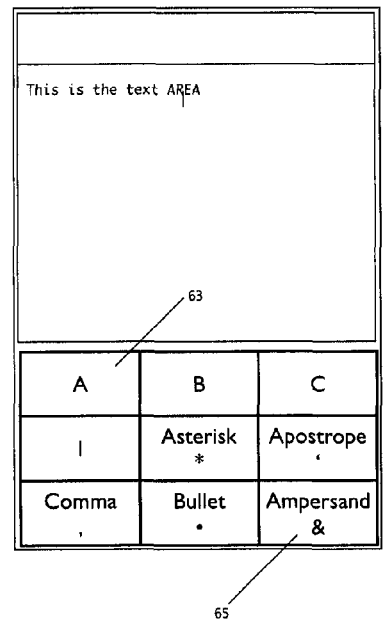

FIGS. 6a to 6c schematically illustrate a method of using the statistical frequency to create an alphabetical keyboard to make it easier for users who are not familiar with the QWERTY keyboard layout. As this alphabetical arrangement takes up less space, it helps users who wish to have a bigger viewing area 151. Two alphabetical arrangements are shown. FIG. 6a shows a set of 16 boxes that contain one to three letters in each based upon the likelihood that a letter will start a word. Upon the next key the letters can be rearranged based upon the most likely next letter, or kept in an arrangement based upon just the statistics for the first letter as predictive text input can provide an entire word in an average of just over 1 letter per word making it unnecessary to type many keys.

FIG. 6b shows a more common keypad arrangement common on telephone dials with three letters for each button. In this arrangement, the user is able reduce keystrokes by providing him/her with the ability to tap and slide their finger to immediately select a letter that would otherwise need to be typed in two keystrokes. The user is provided with two means of selecting a letter. By tapping key 61, the screen transitions to FIG. 6c by separating the three letters of the key that is tapped into the keys of the top row. To further improve ease of use, the symbols that start with the letters of the key that is typed along with the number shown on the button 61 are shown in the screen of FIG. 6c. This can also be done with a standard keyboard by allowing the user to hold their key selection for a longer period of time to bring up a new screen that has symbols or commands starting with that letter key.

The system shown in FIG. 6b can also provide significant improvement in usability in vehicle console systems where the user needs to quickly access a function with minimal distraction. By having very large buttons a driver can more safely and easily access the functions. They can tap twice or tap and drag a key to access in one tap and drag. For example, a user can tap and drag the VWX key to the left and get a button to control the volume making all functions just one quick tap away from the driver.

Users are also able to enter their letter from the key 61 of FIG. 6b by tapping and sliding. In this example, if the user wanted the letter "C" the finger would slide to the right after tapping as the letter "C" is the letter to the right of the "ABC" grouping. To select the letter "A" the user would tap and slide left and to get a "B" the user would tap and slide up and to get the number 1 they would tap and slide down.

Figure 7A:
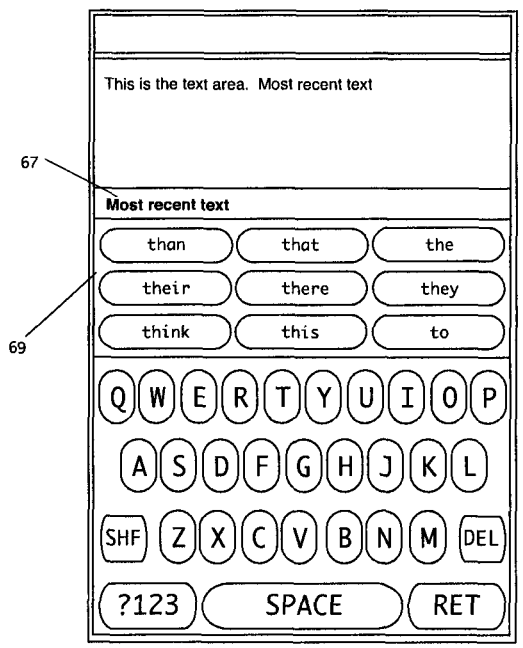
FIGS. 7a and 7b schematically illustrate a way of allowing the user to keep their gaze focused closer to the keys and in the example shown, a predictive keyboard with word choices. The duplicated text is a proxy for the text that is being typed in other areas of the screen and shares the same characteristics as well as the ability to select a word from the proxy list to edit it.
Figure 7B:
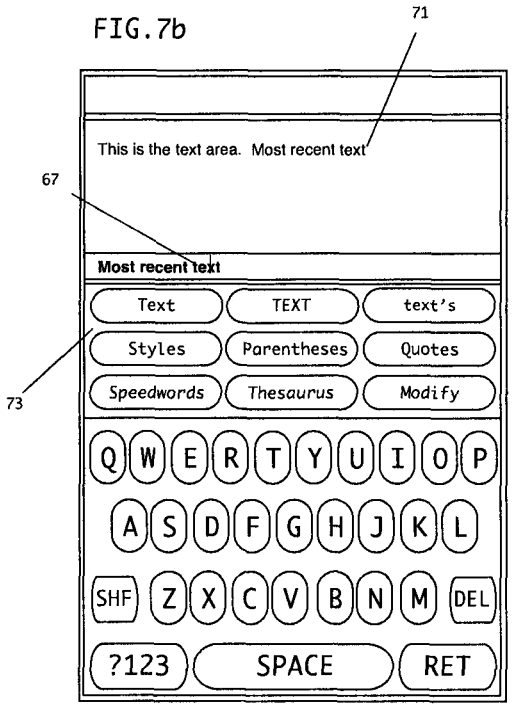

Having the text area 71 far from the letters or predictive text word choices can make it harder for users to type and create more errors. As virtual keyboards can be used on devices such as tablets the text area can be quite far from the keyboard. FIGS. 7a and 7b schematically illustrate a way of allowing the user to keep their gaze focused closer to the keys. In the exemplary figures shown, a predictive keyboard with word selection buttons also appears. The duplicated text shown as 67 is a proxy for the text that is being typed in other areas of the screen. It has the additional benefits that it can share the same characteristics of the text from text area 71 as well as have the ability to select a word and do editing functions directly from the proxy area 67 that would normally require the user to select the text far from the keyboard.

Figure 8A:
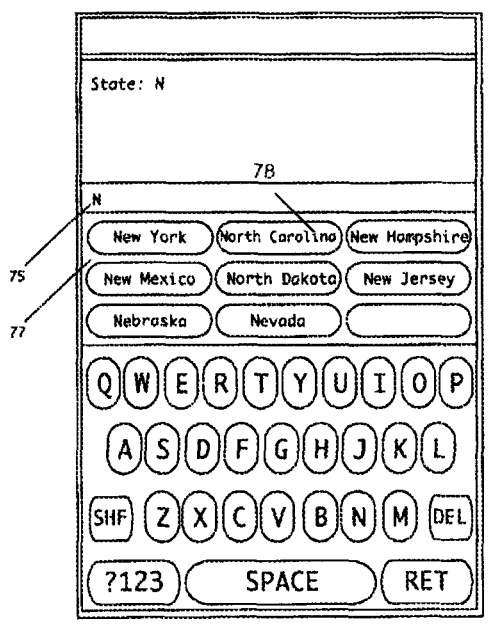
FIGS. 8a and 8b schematically illustrate the ability to significantly reduce user error by selecting a subset of words to show the user based upon the context. As predictive text systems can more easily display the most likely word for the user to select, keystrokes along with errors can be reduced.
Figure 8B:
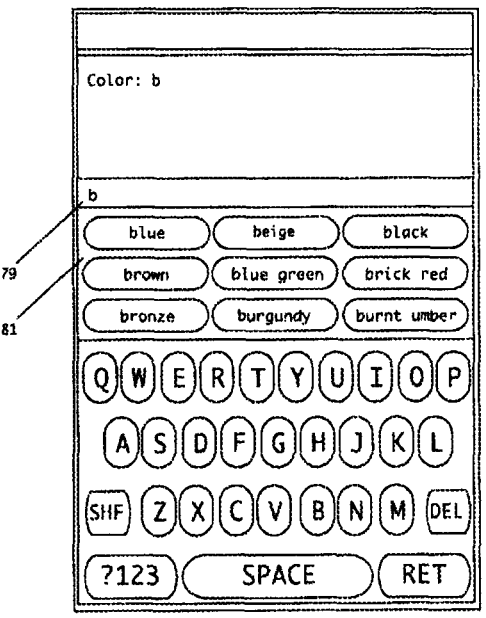

In FIGS. 8a and 8b, a predictive text system is shown that uses the location of the user's cursor to improve the choices that are shown. By reducing the subset of word choices, typing and errors can be further reduced. In the example diagram of FIG. 8a, the user is entering a state name and types the letter "N" 75. Since there are only 8 states that start with this letter, the user can immediately select from only this group, displayed in area 77. For example, the user may select "North Carolina" 78. In FIG. 8b, the user is asked to choose a color, and types the letter "b" 79 and is shown a selection of colors that start with that letter (in an area 81) making it likely that the user will be able to enter his/her color choice with a substantially reduced set of choices. By monitoring the location of the cursor, the statistical frequency that is calculated for each selection can be significantly improved by using only the subset of words or letter strings that are most likely. Users that are typing the letter "N" in a URL can be shown "nytimes.com", but when filling out a form that shows "state" it would change to "New York, North Carolina, New Hampshire, New Mexico, etc."

Figure 9A:
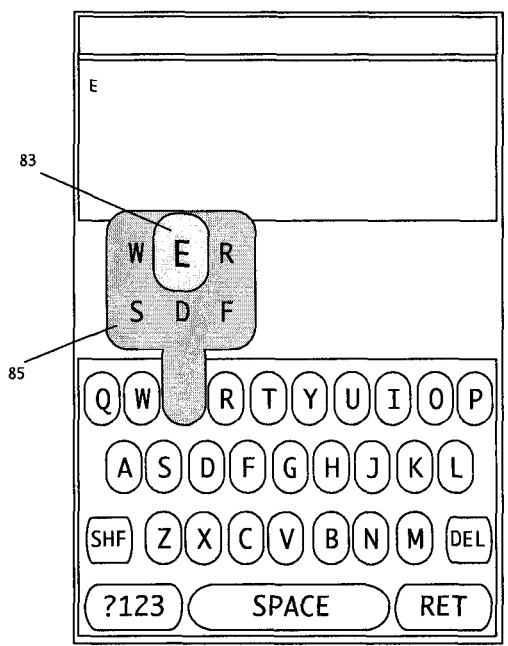
FIG. 9a schematically illustrates an improved way to allow a user to ensure that the key that was selected on a virtual keyboard is correct and give the user an opportunity to adjust their finger to select the correct key.
Figure 9B:
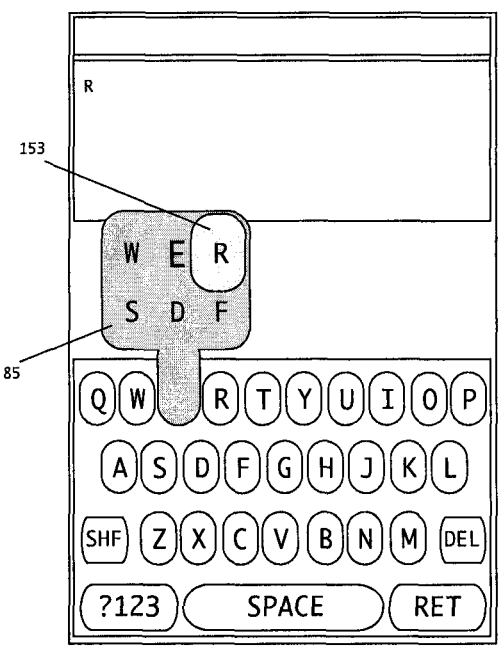
FIG. 9b schematically illustrates the feedback that the user receives when they mistype a key and move their finger closer to the correct key to fix their error.

FIGS. 9a and 9b schematically illustrate an improved method of allowing the user to be sure that the key that they have pressed is the one that they want by showing them the letter that will be entered 83 along with the surrounding keys 85. This gives the user the opportunity to adjust his or her choice before letting go to make a key selection. In FIG. 9a the user wanted the letter "E" and saw the confirmation in 83 and let go to see the letter "E" appear. In FIG. 9b the user wanted the letter "R" but had his/her finger positioned too close to the letter "E". After seeing the letter "E" in 83 the user slid his/her finger in the direction of the letter "R" so that the highlight window 153 had move to the right and showed that the letter "R" would be selected. The user then let go and a letter "R" was selected.

In FIGS. 10a and 10b, the keyboard is eliminated by enabling the user to enter a specific key using a set of gestures. With multi-touch displays, gestures can now be easier to remember and faster to perform. Multi-touch displays and systems are well known, such as those disclosed in U.S. Patent Publication No. 2006/0097991, which is incorporated herein by reference.

A multi-touch based gesture set in accordance with the present invention is shown in FIG. 10b. The disclosed gesture set has a low likelihood of errors and calculates the most likely alternative keys that the user might have wanted and gives the user the opportunity after entering his/her letter to have it replaced by one of the most likely choices shown as 89. In FIG. 10b, a user who wanted to type, for example, the letter "E" would slide three fingers to the right in one movement. In almost all cases, this efficient gesture set has one or two movements based upon the letter shape so that it is easy to remember. In the case of the letter "Q" the user can tap with one finger, and then drag to the right.

FIG. 11a schematically illustrates a physical keyboard 91 that can attach to a virtual device to allow a user who prefers the physical keyboard to quickly attach and detach it from his/her device so that they can quickly transition from typing to other tasks that require the full screen such as viewing a picture. In this example the keyboard is made of a rubber material embedded with a capacitive substance so that the keypress connects to activate a multi-touch display and is attached by suction cups 93. By having a translucent material embedded in the keys 95 and an opaque material in the rest of the keyboard 91 the statistically most likely key choices can still be shown to the user by changing the brightness of the screen in the areas that are directly below the physical keypad. The keypad could also be positioned on a tablet and the user could be requested to make two key presses to allow the device to know the position of the keyboard to be able to position the keys in the correct place and provide the user with various other software features such as predictive text and the statistical frequency of the letters. FIG. 11b shows that this means of adding a physical device to a virtual keyboard can be achieved for other tasks such as knobs or buttons. In the case of the knob, a capacitive material that can slide easily over a screen such as silver cotton can be positioned at one portion of a disk and requesting the user to make a complete turn of the knob or press the button to identify its location on the screen. The keypad's position can also be auto-detected by having two points of contact that are recognized by the device.

Figure 12:
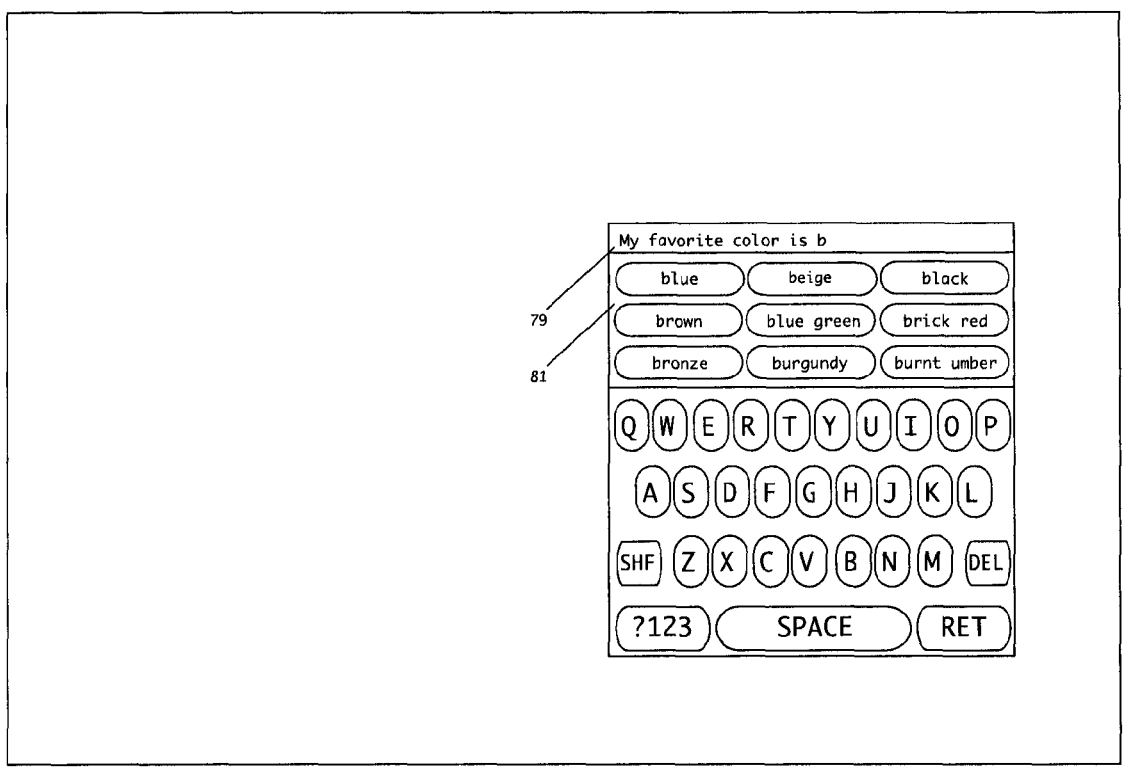
FIG. 12 schematically illustrates a movable keyboard that can be repositioned anywhere on the screen.

FIG. 12 schematically illustrates a keyboard that can be used on a tablet computer that has the additional benefit that it can be repositioned anywhere on the screen.

Figure 13A:
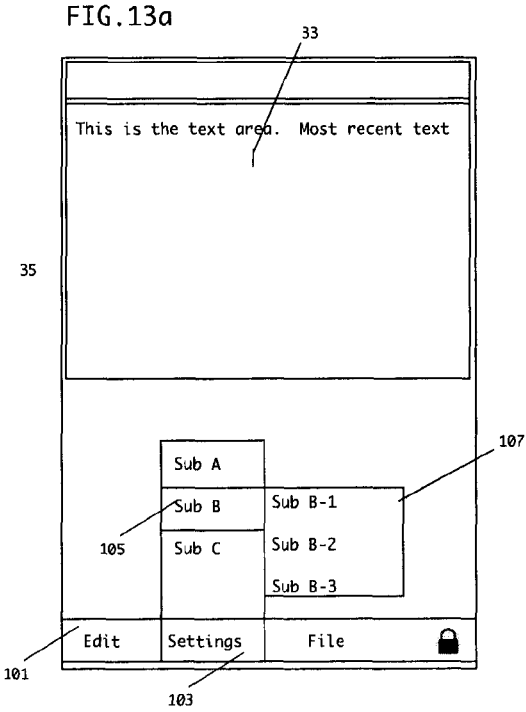
FIGS. 13a and 13b schematically illustrate an improved way to access a menu bar on a touch-screen device. The finger slides across a diagonal bar and slides up to select the menu. To select a submenu the user swipes right or left and could slide up and down to select another submenu. A dual sliding system could also be used which has one slide that changes the entire menu to a new set of choices, and the other to select among the current menu choices.
Figure 13B:
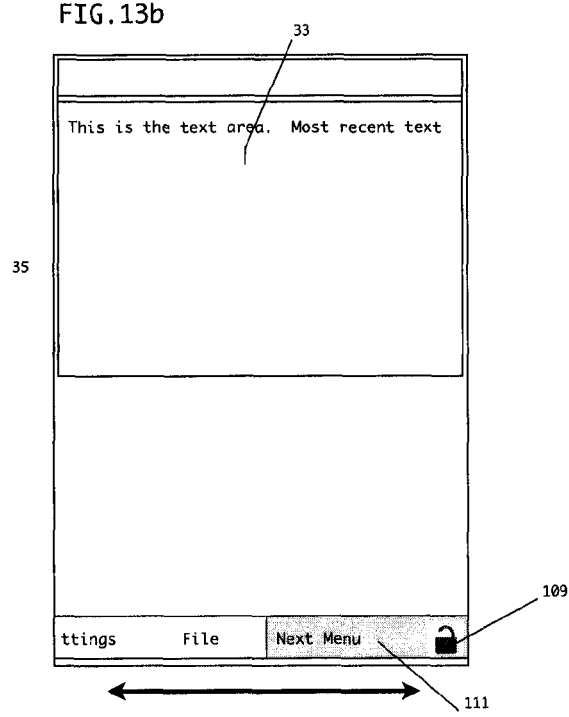

FIG. 13 schematically illustrates a way for the user to interact with menus on a touch screen device. Menus have been moved to the bottom of the screen and submenus go up instead of down since users tend to hold their mobile devices at the bottom. A sliding menu is shown that allows the user to slide the menu from one menu bar to another allowing a larger set of menu choices making it easier to operate menus on smaller touch screen devices or use programs that have many menus or submenus. The menu sliding feature can be locked to avoid accidentally changing to another menu and the menus can be color coded to make it easier to quickly see what menu is shown.

Figure 14:
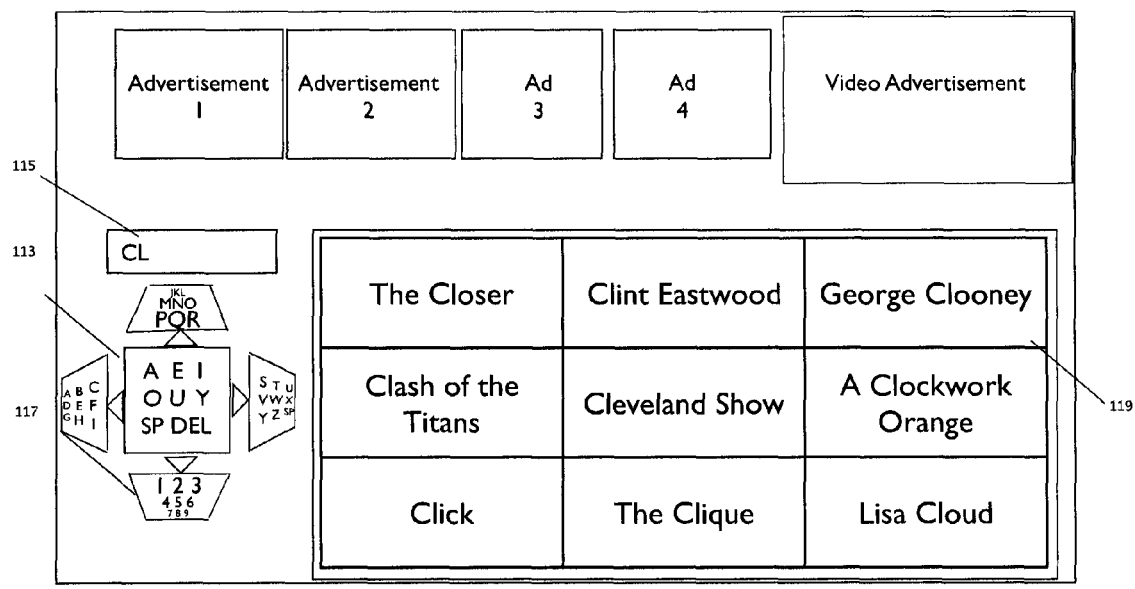
FIG. 14 schematically illustrates a method of using the statistical calculation of the most likely next letter on a television to find a program to record. In this case, a DRV input screen is shown with the remote control keyboard as the means of selecting the letter with the number keys on the keypad. By using this predictive letter methodology a user can select an item using nearly one key press for each letter rather than the average of nearly 5 or more in the current systems.

FIG. 14 schematically illustrates how the statistically most likely next letter can dramatically improve entering data on a remote control unit, though it can also be used on a mobile device. In FIG. 14 the user wants to select a show and has typed two letters "CL" shown in the DVR example in text box 115. If the show that the user wants is not shown in predictive text box 119, the most likely next letters are available for the user to type in box 113. As there are only 6 letters that statistically appear following CL, the user is almost assured to get his/her next letter in just one button press. As this can be done following nearly all letters, data entry can be meaningfully improved nearly to the point of one key press per character entered on nearly all devices including devices such as a remote control unit where there are only enough keys to represent only a small subset of the alphabet. By combining the statistical likelihood of an individual letter being chosen with the most likely words, most data entry functions can be even more dramatically improved.

Figure 15A:
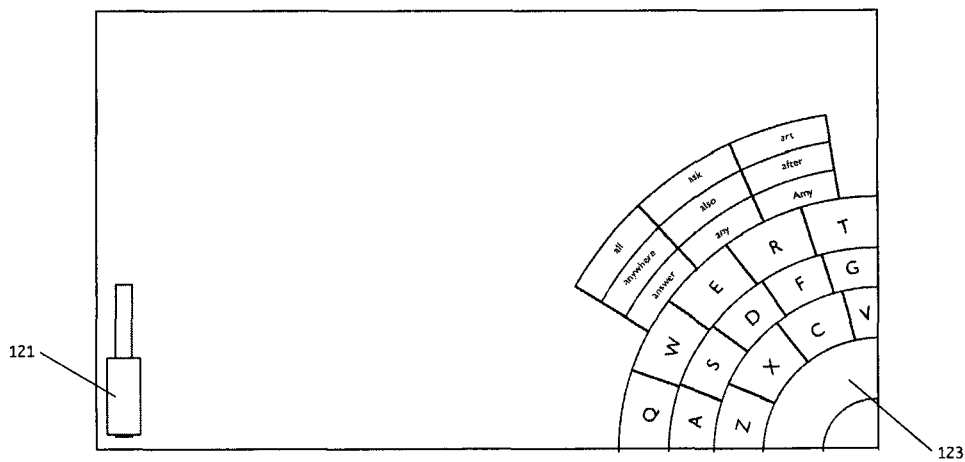
FIGS. 15a and 15b schematically illustrate a method of providing the user with an easy to enter keyboard on a tablet when the user is holding the device at the bottom and can only move their thumbs in an arc. By providing a switch to turn the keyboard wheel the user can be provided with a larger key that can be controlled as needed.
Figure 15B:
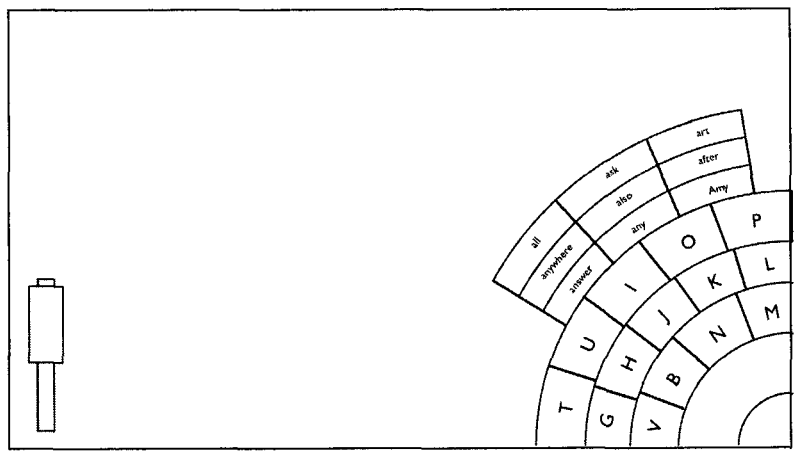

FIGS. 15a and 15b schematically illustrate a circular keyboard 123 that can be further improved by a switch 121 that can move the keyboard to additional choices. A keyboard and a predictive word system is shown in FIGS. 15a and 15b, but the selection can be for menus, pictures or other systems where a user, especially a tablet user that often holds the device on the bottom might want to select through various choices. The slider 121 is shown causing a circular keyboard to spin clockwise and counterclockwise, but the slider could be a button that causes the wheel to spin continuously in one direction with new information such as choosing a picture.

Figure 16A:
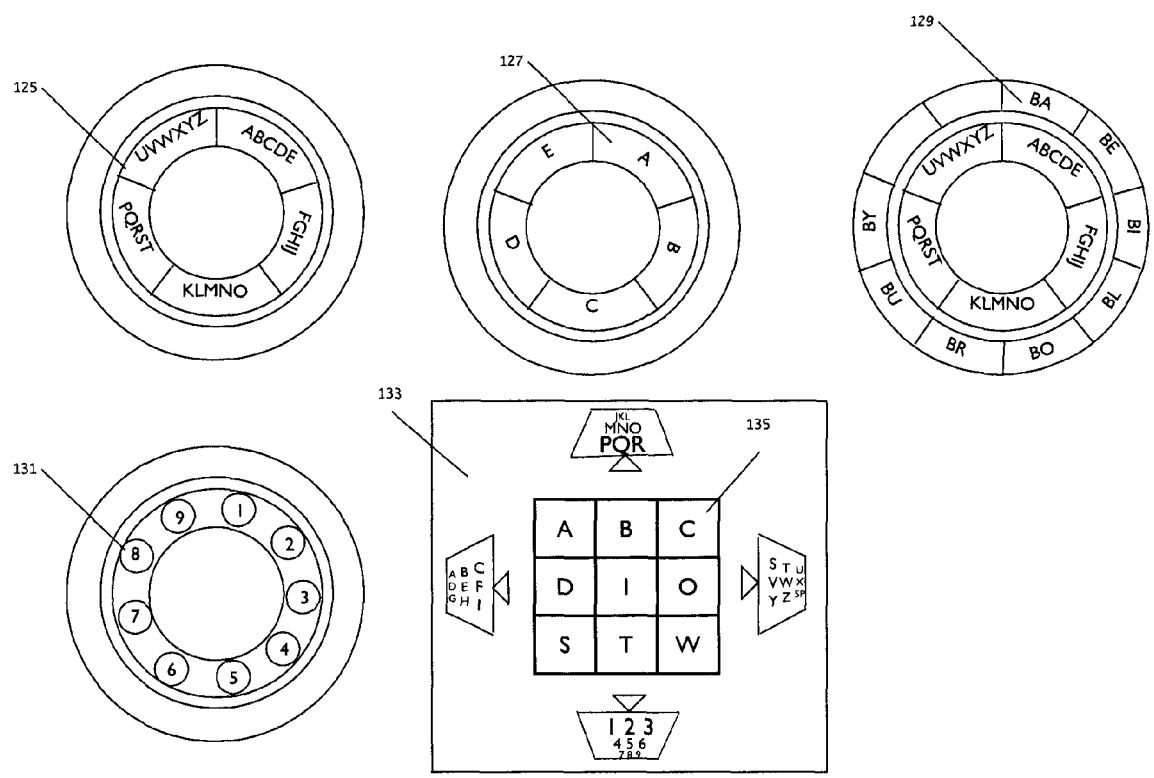
FIG. 16a schematically illustrates a method of providing the user with an easy to enter keyboard on a device with a wheel such as an iPod. In this example, the disk is divided into 5 groupings. By providing the user with the most likely key to start and after each letter is entered, the user can get close to one keystroke per letter.

FIG. 16 schematically illustrates how the letter prediction can allow typing on devices with scroll wheels 125 such as on an iPod. In the example shown, the scroll wheel is separated into various regions that are shown on a screen 133 that displays to the user the most likely keys 135. By pressing the scroll wheel to enable a button press at the top, bottom and right and left sides, an alternative keyboard is displayed to select any letter that does not appear in the statistical set that is shown. This is likely to work especially well for landscape mode where a user holding a tablet device with both hands cannot reach keys that are in the middle of the screen. For portrait mode, an additional improvement of splitting the keyboard and enclosing predictive words between the two sets of keyboard letters can further improve the ease of use.

Figure 17A:
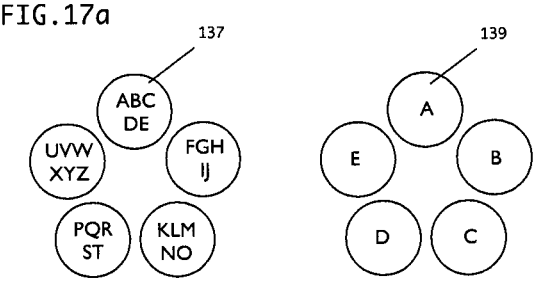
FIGS. 17a and 17b schematically illustrate a text entry method that employs five circles that collectively represent the alphabet.
Figure 17B:
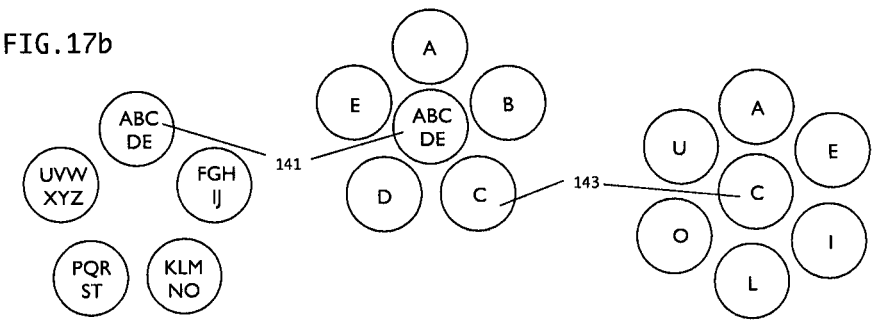

FIGS. 17a and 17b schematically illustrate how this system can be set up on a touch screen device where only 5 circles are used to represent the alphabet. In FIG. 17a, upon a keypress, the circle that the user typed 137 causes the entire set of circles to be repopulated with the letters that were shown in the grouping. The user typed the circle containing "ABCDE" and the circles were repopulated with "A", "B", "C", "D" and "E".

In FIG. 17b, when circle 141 is selected the new circles surround the selected circle allowing the user to drag to the next letter. The user can also be shown the set of most likely next letters after selecting the circle as shown when the user selected the circle with the letter "C" 143 after typing the "ABCDE" circle 141. Afterwards the user is shown the most common letters that come after the letter "C" allowing the user to drag to that letter.

Figure 18A:
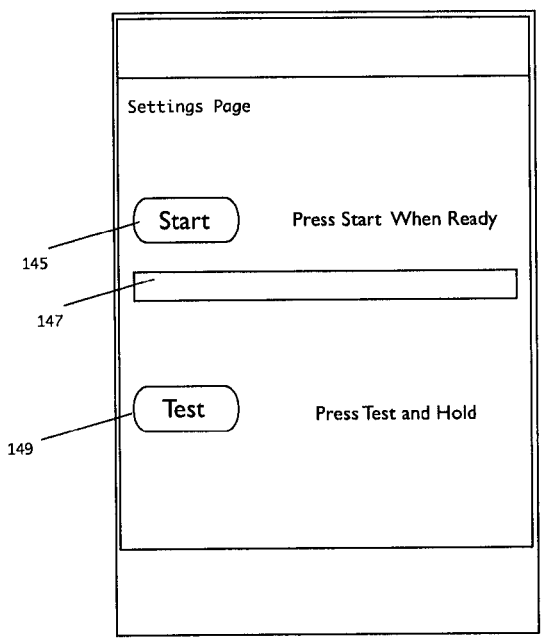
FIGS. 18a and 18b schematically illustrate a method of improving upon the setting interface when a user needs to set the time that a key press is held. By pressing to start the timer, and holding until the user feels the time is appropriate, the time for a setting can best be set.
Figure 18B:
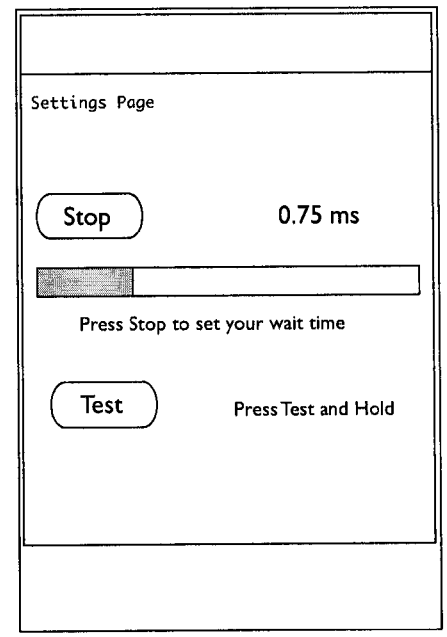

FIGS. 18a and b illustrate an improvement in creating a user setting to allow a button that performs a task on a key press to be given an additional task on a long keypress. As most users have different views of what "long" is this improvement aims to allow each user to customize his/her long key press by actually performing the task and recording the time that elapsed rather than having the user estimate the time that they want by pressing button 145. After setting the time, the user can test the performance immediately by pressing button 149 to see if the time set functions as expected and be given the opportunity to reset the time.

Table 1 below provides a few examples of the improved data entry of symbols and digits using letters. The rule of use allows users to enter almost anything on their device with just the letter keys in the alphabet of their language. To make it flexible and expandable, the following set of rules were developed that can be easy for a user to understand.

Rule 1: The first letter of the name of the symbol or digit, emoticon or emoji or picture that the user wants to enter is double tapped.

Rule 2: If there are more items than can be shown to the user in the space that displays the items and the item has multiple words, then the user can enter the first letter of the second and third words. (example: 100=ooh).

Rule 3: If there are more items than can be shown to the user in the space that displays the items and the item has only one word, then the user can enter the next letter or letters of that word until the symbol appears in the display location. (example: tilde=tti).

Flexibility can be further enhanced by including codes for all symbols by multiple names such as ellipsis and dots for . . . □, number sign and pound sign for #□, etc.

While this allows for various digits and symbols to be easily added, it can also provide an easier way to enter a wide range of data. An example could be accessing the capitol of " New York State". While some users might not know the answer, typing NNY can allow the user to access various information such as the Capitol, the Governor, Senators or other information that could be fixed or variable. Typing USSS can provide the user with the current Secretary of State. Table 2 below provides further examples.

Rule 4: For more complex items, that have enough characters to differentiate the users choice, the first letter of each word can be used such as USST for "United States Secretary of the Treasury" which can bring up the title or the actual person or both. While a coding system is disclosed, this system can be modified to provide for a similar functionality.

TABLE 1

| Symbol | Name | Code |
| --- | --- | --- |
| @ | Commercial at | aa |
| ! | Exclamation point | ee |
| # | Number sign | nn |
| $ | Dollar sign | dd |
| % | Percert sign | pp |
| ^ | Caret | cc |
| & | Ampersand | aa |
| * | Asterisk | aa |

TABLE 1-continued

| Symbol | Name | Code |
|---|---|---|
| ( | Open Parenthesis | oo |
| ) | Closed Parenthesis | cc |
| 1 | One | oo |
| 2 | Two | tt |
| 3 | Three | tt |
| 4 | Four | ff |
| 5 | Five | ff |
| 6 | Six | ss |
| 7 | Seven | ss |
| 8 | Eight | ee |
| 9 | Nine | nn |
| 10 | Ten | tt |
| 11 | Eleven | ee |
| 12 | Twelve | tt |
| 13 | Thirteen | tt |
| 14 | Fourteen | ff |
| 15 | Fifteen | ff |
| 16 | Sixteen | ss |
| 17 | Seventeen | ss |
| 18 | Eighteen | ee |
| 19 | Nineteen | nn |
| 20 | Twenty | tt |
| 21 | Twenty-One | tto |
| 22 | Twenty-Two | ttt |
| 23 | Twenty-Three | ttt |
| 100 | One Hunded | ooh |
| { | Left Curly Bracket | licb |
| ~ | Tilde | tti |
| ® | Registered Sign | rr |
| © | Copyright Sign | cc |
| ¥ | Yen Sign | yy |
| ¡ | Inverted Exclamation Point | eei |
| ‡ | Double Dagger | ddd |
| 🇺🇸 | Emoji - US Flag | eeusf |

TABLE 2

| Information | Name | Code |
|---|---|---|
| New York State Captial | Albany | NYSC |
| New York Yankees Shortstop | Derek Jeter | NYYSS |
|  | New York Yankees Shortstop | NYYSS |
| United States Secretary of the Treasury | Tim Geithner | USST |
|  | United States Secretary of the Treasury | USST |
|  | LaGuardia Airport | LGA |
|  | Exxon-Mobil | XOM |

In certain embodiments described herein, the present invention provides the user with an improved means of data entry by highlighting or showing the user those keys that have the highest statistical likelihood of being the next most frequent key that comes after the keys that were entered so far to type a given word. As a result, by showing the user a reduced set of keys it allows the user to avoid searching through letters that are statistically unlikely to occur.

With regard to highlighting or showing those keys that have the highest statistical likelihood of being the next most frequent key after an already entered key or keys, statistical likelihood is distinguished from merely identifying those keys that possibly can follow an already entered key without concern for statistical likelihood. As an example, when the corpus is the complete language, there are often rare words and abbreviations that have most all combinations of letters so that removing (or otherwise distinguishing) letters that cannot possibly follow an already entered letter provides practically no benefit. Examples of rare words having highly unusual letter combinations include aardvark and pterodactyl. Examples of abbreviations with unusual letter combinations include YMCA, FBI and ABC. Accordingly, by using the statistical frequency of the letter combinations rather than all combinations, a reduced subset of the letters can be shown to the user that has the benefits of having both a high likelihood of being the letter that is desired, along with meaningfully reducing the letters that are required to be reviewed.

As described herein, the frequency-based display of the most likely keys are achieved on both a touch screen display as well as a physical keyboard. The touch screen display is able to implement the present invention by dynamically changing the virtual keys. On a physical keyboard, the lighting or color of actual physical keys can be changed using various methods as already described herein.

The results of the frequency-based calculation can separate the most likely next key into any number of groupings, but the preferred embodiment uses two groups. When combined with a predictive text system, the combination of the two systems substantially helps to create a data input methodology that enhances ease-of-use and reduces error rates.

The present invention has been described in the context of a number of embodiments, and multiple variations and examples thereof. It is to be understood, however, that other expedients known to those skilled in the art or disclosed herein may be employed without departing from the spirit of the invention.

Therefore, it is intended that the appended claims be interpreted as including the embodiments described herein, the alternatives mentioned above, and all equivalents thereto.

What is claimed is:

1. A system for reducing data entry errors, comprising:
an input component controllable to display a plurality of keys selectable by a user in accordance with a controllable viewing mode, the input component receiving input by the user;
a display component controllable to display one or more key images;
a processor operatively coupled to the input component and the display component, and programmed to:
control the display component to display a key image or images corresponding to key selection input by the user on the input component;
ascertain a subset of the keys selectable by the user based upon respective likelihoods that each of the keys follows a previously selected key or keys within a predetermined language or subset thereof;
define the controllable viewing mode so that the input component displays each of the keys within the ascertained subset of keys in a manner visually distinguishable by the user from each of the keys not within the ascertained subset of keys;
control the input component to display the plurality of keys selectable by the user in accordance with the controllable viewing mode as defined by the processor;
define the controllable viewing mode so that the input component is controlled to display each of the keys within the ascertained subset of keys in a three-dimensional format that includes a top surface and side surfaces, and to display each of the keys not within the ascertained subset of keys in a three-dimensional format that includes a bottom surface and side surfaces.

2. The system of claim 1, wherein a location on the input component of each of the keys selectable by the user as displayed by the input component is the same regardless of the controllable viewing mode as defined by the processor.

3. The system of claim 2, wherein the input component displays the plurality of keys in accordance with a QWERTY format.

4. The system of claim 1, wherein the input component and the display component collectively are a touch sensitive display.

5. The system of claim 4, wherein the input component displays a plurality of display elements and displays the plurality of keys selectable by the user within the display elements in accordance with the controllable view mode.

6. The system of claim 1, wherein the input component includes a physical keyboard having a plurality of physical key switches, the input component further including a display device projecting images of the keys on an underside of each of the physical key switches in accordance with the controllable viewing mode as defined by the processor.

7. The system of claim 1, wherein the input component includes a physical keyboard having a plurality of physical key switches, each of the keys selectable by the user presented on a respective one of the physical key switches, the input component further including a lighting device operative to project light on an underside of each of the physical key switches in accordance with the controllable viewing mode as defined by the processor.

8. The system of claim 1, wherein the input component displays the keys in a circular format.

9. The system of claim 1, wherein the keys selectable by the user are letters in the predetermined language.

10. The system of claim 1, wherein a target area of each of the keys corresponds to the respective top surface of the key displayed by the input component.

11. The system of claim 10, wherein the processor recognizes a key selection input by the user upon contact within the respective target area of the key on the input component.

12. The system of claim 1, further comprising a proximity sensor recognizing a presence of a finger adjacent the input component, wherein the processor is programmed to control the input component to display each of the displayed keys that are proximal to the finger in a magnified format.

13. The system of claim 1, wherein the processor controls the display component to display, at a location immediately adjacent to a location of the input component, a duplicate copy of recently selected keys so that the user is able to view and verify the keys being selected without viewing a portion of the display component not adjacent to the input component.

14. A predictive text entry system, comprising:
an input component controllable to display a set of letters selectable by a user and to display a set of word selections selectable by the user, the input component receiving input by the user;
a display component controllable to display one or more letter images or words;
a processor operatively coupled to the input component and the display component, and programmed to:
control the display component to display a letter or word corresponding to an input by the user on the input component;
determine a corpus based on a location of a cursor displayed on the display component;
ascertain a set of choices within the determined corpus that are statistically the most likely choices based on a previous input of a letter by the user;
control the input component to display the choices within the ascertained set of choices as the set of word selections selectable by the user,
wherein the location of the cursor displayed on the display component is a field of a form,
wherein the corpus is determined based on a name of the field of the form.

15. The predictive text entry system of claim 14, wherein the display component displays one or more corpuses, and the processor determines the corpus in which to ascertain a set of choices based upon the displayed corpus that is adjacent to the cursor displayed on the display.

16. The predictive text entry system of claim 14, wherein the corpus is determined based on a displayed name of the field of the form.

17. A method of reducing data entry errors in a system having an input component, a display component and a processor operatively coupled to the input and display components, the method comprising:
displaying, by the input component, a plurality of keys selectable by a user in accordance with a controllable viewing mode,
receiving, by the input component, input by the user;
displaying, by the display component, one or more key images based on the input by the user;
ascertaining, by the processor, a subset of the keys selectable by the user based upon respective likelihoods that each of the keys follows a previously selected key or keys within a predetermined language or subset thereof;
defining the controllable viewing mode so that the input component displays each of the keys within the ascertained subset of keys in a manner visually distinguishable by the user from each of the keys not within the ascertained subset of keys;
defining the controllable viewing mode so that the input component is controlled to display each of the keys within the ascertained subset of keys in a three-dimensional format that includes a top surface and side surfaces, and to display each of the keys not within the ascertained subset of keys in a three-dimensional format that includes a bottom surface and side surfaces.

18. The method of claim 17, wherein a location on the input component of each of the keys selectable by the user as displayed by the input component is the same regardless of the controllable viewing mode as defined by the processor.

19. The method of claim 18, wherein displaying, by the input component, comprises displaying the plurality of keys in accordance with a QWERTY format.

20. The method of claim 17, wherein the input component and the display component collectively are a touch sensitive display.

21. The method of claim 20, wherein displaying, by the input component, comprises displaying a plurality of display elements and displaying the plurality of keys selectable by the user within the display elements in accordance with the controllable view mode.

22. The method of claim 17, wherein the input component includes a physical keyboard having a plurality of physical key switches and a display device; wherein displaying, by the input component, comprises projecting by the display device images of the keys on an underside of each of the physical key switches in accordance with the controllable viewing mode as defined by the processor.

23. The method of claim 17, wherein the input component includes a physical keyboard having a plurality of physical key switches and a lighting device, each of the keys selectable by the user presented on a respective one of the physical key switches, wherein displaying, by the input component, comprises projecting, by the lighting device, light on an underside of each of the physical key switches in accordance with the controllable viewing mode as defined by the processor.

24. The method of claim 17, wherein displaying, by the input component, comprises displaying the keys in a circular format.

25. The method of claim 17, wherein the keys selectable by the user are letters in the predetermined language.

26. The method of claim 17, wherein a target area of each of the keys corresponds to the respective top surface of the key displayed by the input component.

27. The system of claim 26, wherein the processor recognizes a key selection input by the user upon contact within the respective target area of the key on the input component.

28. The method of claim 17, comprising recognizing a presence of a finger adjacent the input component, and wherein displaying, by the input component, comprises displaying each of the displayed keys that are proximal to the finger in a magnified format.

29. The method of claim 17, further comprising displaying, by the display component, at a location immediately adjacent to a location of the input component a duplicate copy of recently selected keys so that the user is able to view and verify the keys being selected without viewing a portion of the display component not adjacent to the input component.

30. A method of predicting text entry in a system having an input component, a display component and a processor operatively coupled to the input and display components, the method comprising:
- displaying, by the input component, a set of letters selectable by a user;
- displaying, by the input component, a set of word selections selectable by the user, receiving, by the input component, input by the user;
- displaying, by the display component, one or more letter images or words based on the input by the user;
- determining, by the processor, a corpus based on a location of a cursor displayed on the display component;
- ascertaining, by the processor, a set of choices within the determined corpus that are statistically the most likely choices based on a previous input of a letter by the user;
- controlling the input component to display the choices within the ascertained set of choices as the set of word selections selectable by the user,
- wherein the location of the cursor displayed on the display component is a field of a form
- wherein the corpus is determined based on a name of the field of the form.

31. The method of claim 30, comprising displaying, by the display component, one or more corpuses, and wherein determining comprises determining the corpus based upon the displayed corpus that is adjacent to the cursor displayed on the display component.

32. The method of claim 30, wherein the corpus is determined based on a displayed name of the field of the form.

33. A predictive text entry system, comprising:
- an input component controllable to display a set of letters selectable by a user and to display a set of word selections selectable by the user, the input component receiving input by the user;
- a display component controllable to display one or more letter images or words;
- a processor operatively coupled to the input component and the display component, and programmed to:
- control the display component to display a letter or word corresponding to an input by the user on the input component;
- determine a corpus based on a location of a cursor displayed on the display component;
- ascertain a set of choices within the determined corpus that are statistically the most likely choices based on a previous input of a letter by the user;
- control the input component to display the choices within the ascertained set of choices as the set of word selections selectable by the user,
- wherein the location of the cursor displayed on the display component is a field of a form,
- wherein the corpus is determined based on a displayed name of the field of the form.

34. The predictive text entry system of claim 33, wherein the display component displays one or more corpuses, and the processor determines the corpus in which to ascertain a set of choices based upon the displayed corpus that is adjacent to the cursor displayed on the display.

35. A method of predicting text entry in a system having an input component, a display component and a processor operatively coupled to the input and display components, the method comprising:
- displaying, by the input component, a set of letters selectable by a user;
- displaying, by the input component, a set of word selections selectable by the user, receiving, by the input component, input by the user;
- displaying, by the display component, one or more letter images or words based on the input by the user;
- determining, by the processor, a corpus based on a location of a cursor displayed on the display component;
- ascertaining, by the processor, a set of choices within the determined corpus that are statistically the most likely choices based on a previous input of a letter by the user;
- controlling the input component to display the choices within the ascertained set of choices as the set of word selections selectable by the user,
- wherein the location of the cursor displayed on the display component is a field of a form,
- wherein the corpus is determined based on a displayed name of the field of the form.

36. The method of claim 35, comprising displaying, by the display component, one or more corpuses, and wherein determining comprises determining the corpus based upon the displayed corpus that is adjacent to the cursor displayed on the display component.

* * * * *